US012802509B2

(12) United States Patent
Zheng et al.

(10) Patent No.: US 12,802,509 B2
(45) Date of Patent: Nov. 17, 2026

(54) SHEET-TYPE MEDIUM ACCUMULATING AND SEPARATING APPARATUS AND CASH RECYCLING AND PROCESSING DEVICE

(71) Applicant: Shandong New Beiyang Information Technology Co., Ltd., Shandong (CN)

(72) Inventors: Lei Zheng, Shandong (CN); Jianyu Sun, Shandong (CN); Chuntao Wang, Shandong (CN); Gang Zhao, Shandong (CN); Bingqing Liu, Shandong (CN)

(73) Assignee: SHANDONG NEW BEIYANG INFORMATION TECHNOLOGY CO., LTD., Shandong (CN)

( * ) Notice: Subject to any disclaimer, the term of this patent is extended or adjusted under 35 U.S.C. 154(b) by 976 days.

(21) Appl. No.: 18/005,776

(22) PCT Filed: Jul. 9, 2021

(86) PCT No.: PCT/CN2021/105361
§ 371 (c)(1),
(2) Date: Jan. 17, 2023

(87) PCT Pub. No.: WO2022/012419
PCT Pub. Date: Jan. 20, 2022

(65) Prior Publication Data

US 2023/0282054 A1 Sep. 7, 2023

(30) Foreign Application Priority Data

Jul. 17, 2020 (CN) ........................ 202010696387.4

(51) Int. Cl.
*G07D 11/13* (2019.01)
*B65H 3/06* (2006.01)
(Continued)

(52) U.S. Cl.
CPC ............... *G07D 11/13* (2019.01); *B65H 3/06* (2013.01); *B65H 83/025* (2013.01);
(Continued)

(58) Field of Classification Search
CPC .. G07D 11/13; G07D 11/175; G07D 2211/00; G07D 11/00; G07F 19/00;
(Continued)

(56) References Cited

U.S. PATENT DOCUMENTS 5,476,233 A 12/1995 Oshino et al.
10,179,716 B2 * 1/2019 Moriwaki .............. B65H 29/14
(Continued)

FOREIGN PATENT DOCUMENTS

CN 1177786 A 4/1998
CN 1622139 A 6/2005
(Continued)

OTHER PUBLICATIONS

English Translation of WO 2020082989 A1 (Year: 2020).*
(Continued)

*Primary Examiner* — Jeffrey A Shapiro
(74) *Attorney, Agent, or Firm* — Mark H. Whittenberger; Holland & Knight LLP

(57) ABSTRACT

A sheet-type medium accumulating and separating device includes a frame and a paper pressing mechanism. The frame is provided with an storage cavity for accommodating sheet-type media. The storage cavity is provided with a paper inlet, a paper outlet, and a paper kicking roller. A paper supporting plate for supporting the media is further provided in the storage cavity. The paper pressing mechanism includes a paper pressing plate and a driving assembly. The paper pressing plate is provided with a first position and a second position arranged in the direction of stacking. The paper pressing plate includes a paper pressing part arranged
(Continued)

within the storage cavity. The driving assembly is in transmission connection with the paper pressing plate. When the paper pressing plate is in the first position, the paper pressing part is adjacent to the paper outlet, to press the sheet-type media towards the paper kicking roller.

16 Claims, 8 Drawing Sheets

(51) Int. Cl.
*B65H 83/02* (2006.01)
*G07D 11/175* (2019.01)

(52) U.S. Cl.
CPC .... *G07D 11/175* (2019.01); *B65H 2701/1912* (2013.01); *G07D 2211/00* (2013.01)

(58) Field of Classification Search
CPC ...... B65H 83/00; B65H 83/02; B65H 83/025; B65H 29/00; B65H 3/06; B65H 2701/1912
See application file for complete search history.

(56) References Cited

U.S. PATENT DOCUMENTS

| | | | | |
|---|---|---|---|---|
| 11,763,620 | B2 * | 9/2023 | Zheng | B65H 3/44 235/379 |
| 2015/0187159 | A1 | 7/2015 | Yin et al. | |
| 2018/0218557 | A1 | 8/2018 | Cao et al. | |
| 2021/0049853 | A1 * | 2/2021 | Baranowski | B65H 29/34 |
| 2021/0383633 | A1 * | 12/2021 | Zheng | B65H 3/44 |

FOREIGN PATENT DOCUMENTS

| | | | | |
|---|---|---|---|---|
| CN | 101123015 | A | 2/2008 | |
| CN | 101176105 | A | 5/2008 | |
| CN | 101763685 | A | 6/2010 | |
| CN | 101894415 | A | 11/2010 | |
| CN | 102124499 | A | 7/2011 | |
| CN | 103971448 | A | 8/2014 | |
| CN | 104890930 | A | 9/2015 | |
| CN | 205302456 | U | 6/2016 | |
| CN | 205709100 | U | 11/2016 | |
| CN | 107032148 | A | 8/2017 | |
| CN | 108352093 | A | 7/2018 | |
| CN | 108734852 | A | 11/2018 | |
| CN | 109615764 | A | 4/2019 | |
| CN | 109767550 | A | 5/2019 | |
| CN | 110288764 | A | 9/2019 | |
| CN | 210122435 | U | 3/2020 | |
| CN | 111127740 | A | 5/2020 | |
| CN | 111145426 | A | 5/2020 | |
| CN | 111798611 | A | 10/2020 | |
| JP | 2009-20754 | A | 1/2009 | |
| WO | WO 2020082989 | A1 * | 4/2020 | G07D 11/18 |
| WO | 2022012419 | A1 | 1/2022 | |

OTHER PUBLICATIONS

Chinese First Office Action issued in Application Serial No. 202010696387.4 on Feb. 7, 2022.
"Governing Equation of Paper Control and Numerical Analysis of Paper Jam" by Bao et al., School of Aerospace Engineering and Applied Mechanics, Tongji University, Shanghai 200092, China; Chinese Quartely of Mechanics vol. 36 No. 2 Jun. 2015.
International Search Report issued in Application Serial No. PCT/CN2021/105361 on Sep. 28, 2021.

* cited by examiner

SHEET-TYPE MEDIUM ACCUMULATING AND SEPARATING APPARATUS AND CASH RECYCLING AND PROCESSING DEVICE

RELATED APPLICATIONS

The subject application is a U.S. National Stage application of International Application No. PCT/CN2021/105361, filed on 9 Jul. 2021, which claims the benefit of Chinese Patent Application No. 202010696387.4, filed on 17 Jul. 2020. The contents of each application incorporated herein by reference.

FIELD

The present application relates to the field of a sheet-type media processing equipment, for example, to a sheet-type medium accumulating and separating device and a cash recycling and processing apparatus.

BACKGROUND

In order to perform accumulation and separation of sheet-type media, a sheet-type medium accumulating and separating device is provided in the conventional technology, in the device, an storage cavity is provided, a paper inlet and a guide plate are provided at an upper portion of the storage cavity, a paper outlet and a paper discharging mechanism are provided at a lower portion of the storage cavity, and a paper supporting plate movable in an up-down direction is provided in the storage cavity. When to input paper, the paper supporting plate is close to the guide plate, and the sheet-type media enter through the paper inlet and are stacked on the paper supporting plate under the guide of the guide plate; and when to output the paper, the paper supporting plate is far away from the guide plate, and a paper kicking roller of the paper output mechanism passes through the paper supporting plate to abut against the sheet-type media on the paper supporting plate, and rotates to drive the sheet-type media to be output from the paper outlet.

However, there is an issue in such a sheet-type medium accumulating and separating device that, when few sheet-type media on the paper supporting plate are remained, the pressure between the paper kicking roller and the sheet-type media becomes small, and the friction between the paper kicking roller and the sheet-type media is insufficient to enable the paper kicking roller to separate and output of the sheet-type media, thereby causing the separation or output of the sheet-type media to fail.

SUMMARY

A sheet-type medium accumulating and separating device and a cash recycling and processing apparatus are provided according to the present application, which are capable of ensuring sufficient pressure between a paper kicking roller and sheet-type media to increase friction between the paper kicking roller and the sheet-type media so as to ensure that the separating and outputting of the sheet-type media can be performed normally.

In a first aspect, a sheet-type medium accumulating and separating device is provided according to embodiments of the present application, which includes a frame and a paper pressing mechanism. The frame is provided with an storage cavity for accommodating sheet-type media, in a stacking direction of the sheet-type media in the storage cavity, a paper inlet is provided at a first end of the storage cavity, a paper outlet and a paper kicking roller are provided at a second end of the storage cavity, and a paper supporting plate for supporting the sheet-type media is further provided in the storage cavity. The paper pressing mechanism includes a paper pressing plate and a driving assembly, where the paper pressing plate has a first position and a second position arranged in the stacking direction, the paper pressing plate includes a paper pressing part located within the storage cavity, the driving assembly is mounted to the frame and is in transmission connection with the paper pressing plate, and the driving assembly is configured to drive the paper pressing plate to move between the first position and the second position. When the paper pressing part is in the first position, the paper pressing part is adjacent to the paper outlet to press sheet-type media towards the paper kicking roller; and when the paper pressing plate is in the second position, the paper pressing part is adjacent to the paper inlet.

In a second aspect, a cash recycling and processing apparatus is provided according to embodiments of the present application, which includes the sheet-type medium accumulating and separating device of any of the preceding embodiments.

REFERENCE NUMERALS IN THE DRAWINGS

Figure 1:
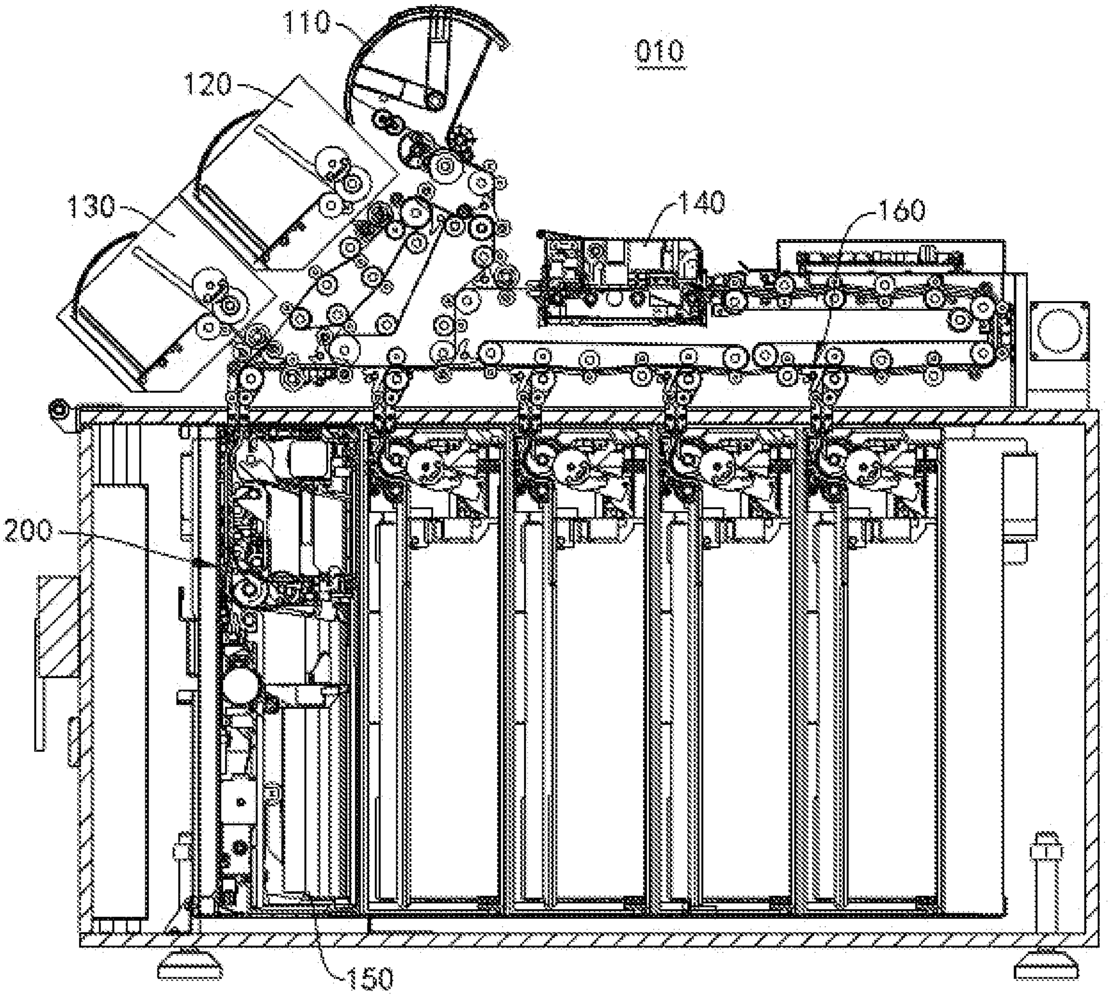
FIG. 1 is a sectional view of a cash recycling and processing apparatus in an embodiment of the present application.

010 cash recycling and processing apparatus
110 banknote input device

120 banknote output device
130 temporary storage device
140 banknote identification device
150 banknote box
160 common passage
200 sheet-type medium accumulating and separating device
210 frame
212 paper inlet
213 paper outlet
214 first storage cavity
216 second storage cavity
217 first inlet and outlet
218 transport passage
219 second inlet and outlet
220 paper pressing mechanism
221 paper pressing plate
222 paper pressing part
223 first rotating shaft
224 paper pressing elastic member
231 paper kicking roller
232 paper input roller
233 paper separating roller
234 paper blocking roller
240 paper supporting plate
250 driving assembly
260 guide plate
261 first guide surface
262 second guide surface
263 accommodating groove
264 connecting part
265 supporting rack
266 second rotating shaft
267 hole
269 roller
271 first guide member
272 second guide member
273 first door
274 second door
280 rotation limiting part
281 position limiting slot
282 plunger
283 first elastic member
284 roller shaft
285 pulley
286 conveyor belt
287 motor
288 resilient hook part
290 paper pressing positioning part
291 paper pressing limiting part
292 paper inputting positioning part
293 paper inputting limiting part
294 boss
300 locking assembly
310 locking member
320 second elastic member
330 retaining slot
311 locking body
312 resilient snap-hook
313 locking positioning part
314 locking limiting part
315 first post
316 second post
317 unlocking positioning part
318 unlocking limiting part

DETAILED DESCRIPTION

It is to be noted that similar reference numerals and letters indicate similar items in subsequent drawings. Therefore, once some item is defined in one drawing, the item needs no more definition and explanation in the subsequent drawings.

In the description of the present application, it is to be noted that, the orientational or positional relationships indicated by terms “above”, “below”, “inner”, “outer” and the like are based on the orientational or positional relationships shown in the drawings or the usual orientational or positional relationships of the product of the present application when used, merely for ease of describing the present application and simplifying the description, rather than indicating or implying that the referred device or element must have a specific orientation and is constructed and operated in a specific orientation, and thus they are not to be construed as limiting the present application. In addition, the terms “first”, “second” and “third” are used only to distinguish between descriptions, and should not be construed as indicating or implying relative importance.

In the description of the present application, it is further to be noted that, unless otherwise expressly specified and limited, the terms “arrange”, “connected” are to be construed in a broad sense, for example, as permanently connected, detachably connected, or integrally connected; mechanically connected or electrically connected; directly connected to each other or indirectly connected to each other via an intermediary; or internally connection of two components. For those of ordinary skill in the art, specific meanings of the preceding terms in the present application may be construed based on specific situations.

FIG. 1 is a sectional view of a cash recycling and processing apparatus 010 in an embodiment of the present application. Referring to FIG. 1, the cash recycling and processing apparatus 010 is provided according to this embodiment, which may be, for example, an automatic teller machine (ATM) or the like, which can be used to deposit and withdraw banknotes.

Optionally, the cash recycling and processing apparatus 010 includes a banknote input device 110, a banknote output device 120, a temporary storage device 130, a banknote identification device 140, and a banknote box 150, and a user can use the banknote input device 110 to store banknotes or take out banknotes from the banknote output device 120. When a user deposits banknotes, the banknotes put into the banknote input device 110 by the user can be conveyed to the banknote identification device 140 one by one through a common passage 160, the banknotes identified as being allowed to circulate can be conveyed to the temporary storage device 130 through the common passage 160, and after the banknotes put into the banknote input device 110 by the user are all identified and the user confirms the deposit, the banknotes temporarily stored by the temporary storage device 130 is conveyed to the banknote box 150 through the common passage 160 for storage. When the user withdraws the banknotes, the banknote box 150 outputs the banknotes one by one, and the banknotes, after being identified and counted by the banknote identification device 140, are conveyed to the banknote output device 120 so that the user can withdraw the banknotes from the banknote output device 120.

At least one of the banknote input device 110, the banknote output device 120, the temporary storage device 130, and the banknote box 150 includes a sheet-type medium accumulating and separating device 200 for accumulating or separating banknotes by the sheet-type medium accumulating and separating device 200. The sheet-type medium accumulating and separating device 200 provided in the banknote box 150 is taken as an example for description hereinafter.

Figure 2:
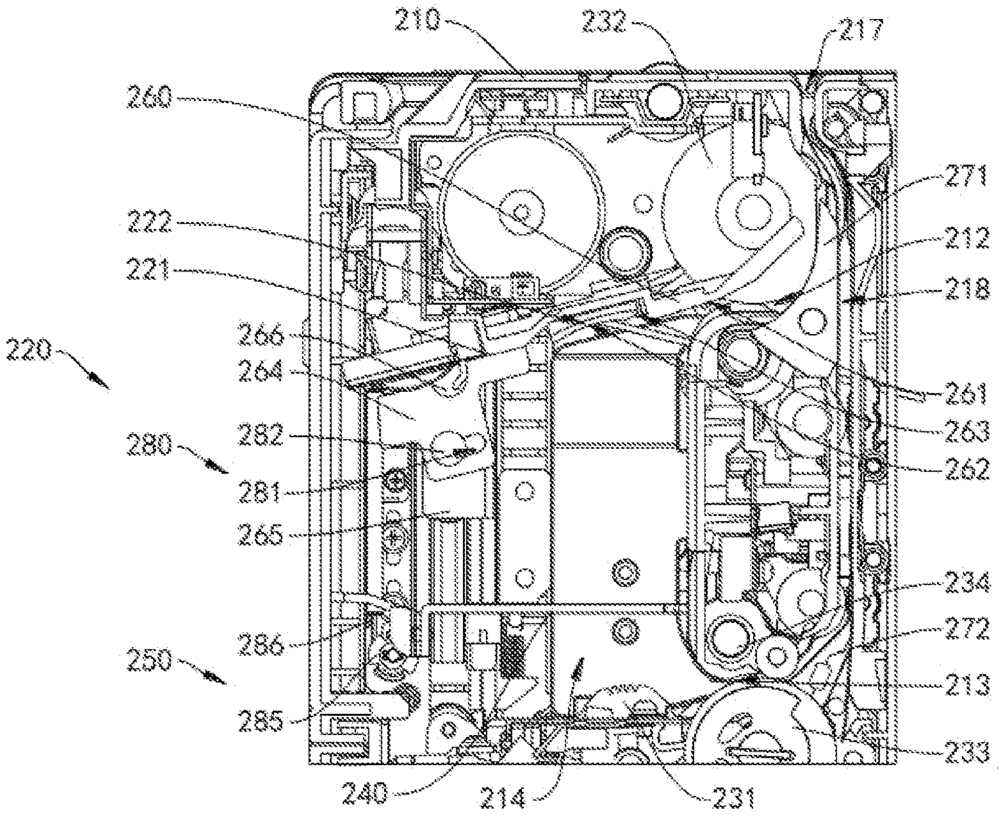
FIG. 2 is a schematic view showing a partial structure of a sheet-type medium accumulating and separating device when a paper pressing plate is in a second position in an embodiment of the present application.
Figure 3:
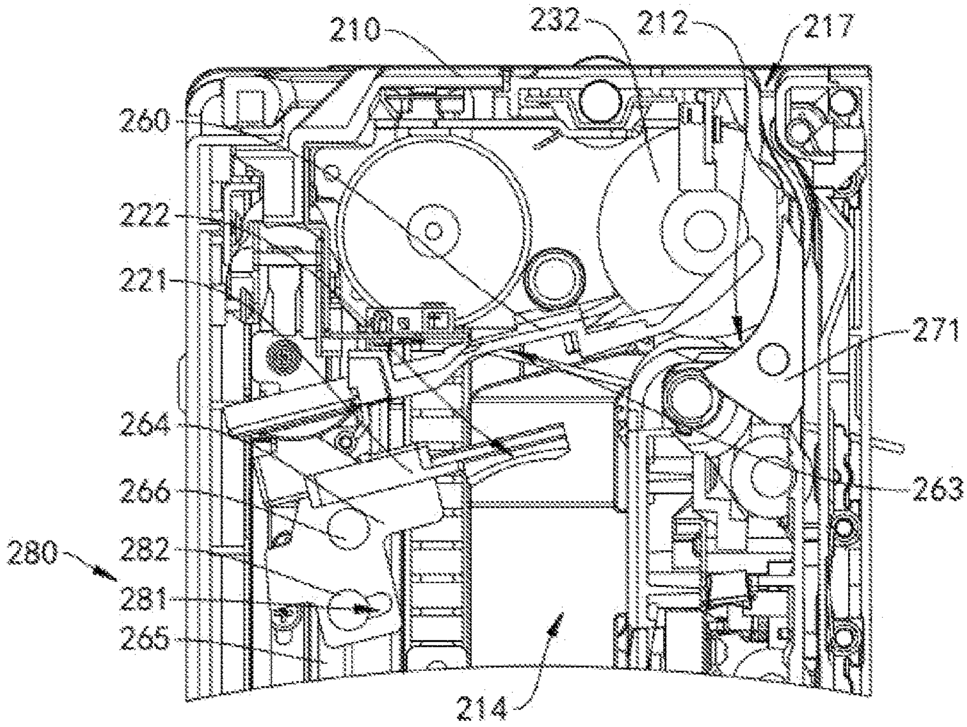
FIG. 3 is a schematic view showing a partial structure of the sheet-type medium accumulating and separating device when the paper pressing plate is in a first position in an embodiment of the present application.

FIG. 2 is a schematic view showing a partial structure of the sheet-type medium accumulating and separating device 200 when a paper pressing plate 221 is located in a second position in an embodiment of the present application; FIG. 3 is a schematic view showing a partial structure of the sheet-type medium accumulating and separating device 200 when the paper pressing plate 221 is located in a first position in an embodiment of the present application.

Referring to FIG. 2 and FIG. 3, the sheet-type medium accumulating and separating device 200 includes a frame 210 and a paper pressing mechanism 220. The frame 210 is provided with an storage cavity (hereinafter referred to as a first storage cavity 214) for accommodating the sheet-type media, the first storage cavity 214 has a first end and a second end in a stacking direction of the sheet-type media in the first storage cavity 214, the first end of the first storage cavity 214 is provided with a paper inlet 212, the second end of the first storage cavity 214 is provided with a paper outlet 213 and a paper kicking roller 231, and the paper kicking roller 231 and the paper outlet 213 are arranged at an interval in an output direction of the sheet-type media in the first storage cavity 214. A paper supporting plate 240 for supporting the sheet-type media is further provided in the first storage cavity 214, and an opening is provided in the paper supporting plate 240 to enable the paper kicking roller 231 to contact the sheet-type media on the paper supporting plate 240 through the opening. The paper pressing mechanism 220 includes a paper pressing plate 221 and a driving assembly 250. The paper pressing plate 221 has a first position and a second position arranged in the stacking direction, the paper pressing plate 221 includes a paper pressing part 222 arranged in the first storage cavity 214, the driving assembly 250 is mounted to the frame 210 and is in transmission connection with the paper pressing plate 221, and the driving assembly 250 is configured to drive the paper pressing plate 221 to move between the first position and the second position. When the paper pressing plate 221 is located in the first position, the paper pressing plate 222 is adjacent to the paper outlet 213 and is configured to press the sheet-type media toward the paper kicking roller 231; and when the paper pressing plate 221 is in the second position, the paper pressing part 222 is adjacent to the paper inlet 212. In this embodiment, the stacking direction of the sheet-type media in the first storage cavity 214 is an up-down direction, the paper inlet 212 is provided at an upper end of the first storage cavity 214, and the paper kicking roller 231 and the paper outlet 213 are provided at a lower end of the first storage cavity 214. In other embodiments, the stacking direction of the sheet-type media in the first storage cavity 214 may be a horizontal direction or a direction at an angle with respect to the horizontal direction.

When the sheet-type medium accumulating and separating device 200 according to this embodiment of the present application is used to separate and output the sheet-type media, the driving assembly 250 can be made to drive the paper pressing plate 221 to be located in the first position, the paper pressing part 222 presses the sheet-type media toward the paper kicking roller 231 to increase the pressure between the paper kicking roller 231 and the sheet-type media so as to increase the friction between the paper kicking roller 231 and the sheet-type media, thereby ensuring that the separating and outputting of the sheet-type media can be performed normally, and even if the sheet-type media on the paper supporting plate 240 remain few, a sufficient large friction between the paper kicking roller 231 and the sheet-type media can be ensured under the action of the paper pressing plate 221 located in the first position, thereby, the remained few sheet-type media can be separated and output smoothly.

When the sheet-type medium accumulating and separating device 200 is used to accumulate the sheet-type media, the driving assembly 250 can be made to drive the paper pressing plate 221 to be located in the second position, and in this case, the paper pressing part 222 is adjacent to the paper inlet 212, the paper pressing part 222 does not interfere with the sheet-type media's entering the first storage cavity 214 via the paper inlet 212 and being stacked on the paper supporting plate 240, which can not only ensure that the accumulation of the sheet-type media is performed smoothly, but also reduce the space of the paper pressing plate 221 occupied in the first storage cavity 214, to allow more sheet-type media to be accumulated in the first storage cavity 214, and facilitate the miniaturization design of the sheet-type medium accumulating and separating device. Illustratively, when the paper pressing plate 221 is in the second position, the paper pressing part 222 is positioned above the path of movement of the sheet-type media into the first storage cavity 214 via the paper inlet 212, so that the issue that the sheet-type media scatter and even move to a position above the paper inlet 212 as the sheet-type media enter the first storage cavity 214 via the paper inlet 212 can be avoided, thereby ensuring that the sheet-type media fall on the paper supporting plate 240.

In this embodiment, when the paper pressing plate 221 is in the second position, the paper pressing part 222 can further guide the moving direction of the sheet-type media entering the first storage cavity 214 via the paper inlet 212, so that the sheet-type media are stacked neatly on the paper supporting plate 240. Illustratively, when the paper pressing plate 221 is in the second position, the paper pressing part 222 is disposed obliquely, an end of the paper pressing part 222 adjacent to the paper inlet 212 is higher than the other end remote from the paper inlet 212, a front end of the sheet-type media entering the first storage cavity 214 via the paper inlet 212 contacts a lower surface of the paper pressing part 222, and move along the lower surface of the paper pressing part 222 until the sheet-type media are stacked neatly on the paper supporting plate 240. Thus, when the paper pressing plate 221 according to this embodiment of the present application is in the second position, the paper pressing plate 221 is capable of guiding the sheet-type media to be stacked neatly on the paper supporting plate 240.

When the sheet-type medium accumulating and separating device 200 according to this embodiment is applied to the cash recycling and processing apparatus 010, the sheet-type medium refers to a banknote. The sheet-type medium accumulating and separating device 200 may also be applied to a bill processing apparatus, a printing apparatus, or the like. The sheet-type medium may refer to a bill, a printing paper, a card-type medium, or the like.

Figure 4:
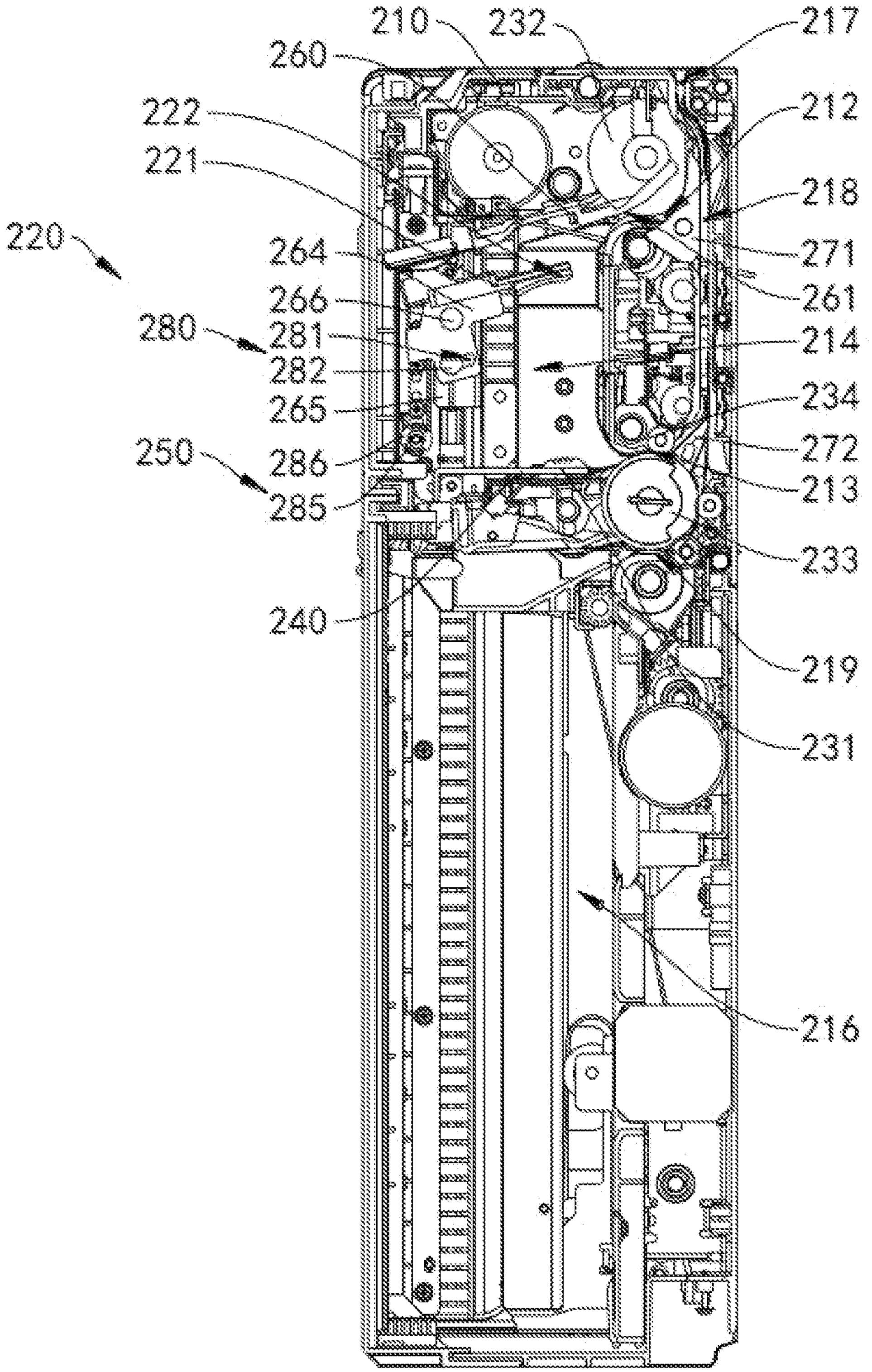
FIG. 4 is a sectional view of the sheet-type medium accumulating and separating device in an embodiment of the present application.

FIG. 4 is a sectional view of a sheet-type medium accumulating and separating device 200 in an embodiment of the present application. Optionally, referring to FIG. 4, the sheet-type medium accumulating and separating device 200 in this embodiment may further include a second storage cavity 216, and the first storage cavity 214 and the second storage cavity 216 are arranged in the stacking direction. The sheet-type medium accumulating and separating device 200 is further provided with a first inlet and outlet 217, a transport passage 218 and a second inlet and outlet 219 in sequence communication. The first storage cavity 214 is adjacent to the first inlet and outlet 217, the paper inlet 212 can be in communication with the first inlet and outlet 217, and the sheet-type media can enter the first storage cavity 214 through the first inlet and outlet 217 and the paper inlet 212. The paper outlet 213 is in communication with the transport passage 218, the first inlet and outlet 217 can be in communication with the transport passage 218, and the sheet-type media in the first storage cavity 214 can be output through the paper outlet 213, the transport passage 218, and the first inlet and outlet 217. The second storage cavity 216 is located below the first storage cavity 214, and the second storage cavity 216 is configured to accommodate sheet-type media. The second inlet and outlet 219 can be in communication with the transport passage 218. When the second inlet and outlet 219 is in communication with the transport passage 218, and the first inlet and outlet 217 is in communication with the transport passage 218, the sheet-type media can be input into or output from the second storage cavity 216 through the second inlet and outlet 219, the transport passage 218, and the first inlet and outlet 217.

Optionally, with continued reference to FIG. 4, the sheet-type medium accumulating and separating device 200 further includes a first guide member 271 and a second guide member 272 rotatably arranged in the frame 210. The first guide member 271 is disposed adjacent to the paper inlet 212 and is disposed to allow the paper inlet 212 to be in communication with the first inlet and outlet 217 while the communication path between the first inlet and outlet 217 and the transport passage 218 to be disconnected, or to allow the communication path between the paper inlet 212 and the first inlet and outlet 217 to be disconnected while the first inlet and outlet 217 to be in communication with the transport passage 218. The second guide member 272 is disposed adjacent to the paper outlet 213, and is disposed to allow the transport passage 218 to be in communication with the paper outlet 213, and simultaneously the communication path of the transport passage 218 with the second inlet and outlet 219 to be disconnected, or to allow the communication path of the paper outlet 213 with the transport passage 218 to be disconnected, and simultaneously the transport passage 218 to be in communication with the second inlet and outlet 219. In an embodiment, both the first guide member 271 and the second guide member 272 may be driven to rotate by a driving member such as a motor, an electromagnet, so as to adjust the position to realize communication and disconnection of different communication paths.

Figure 5:
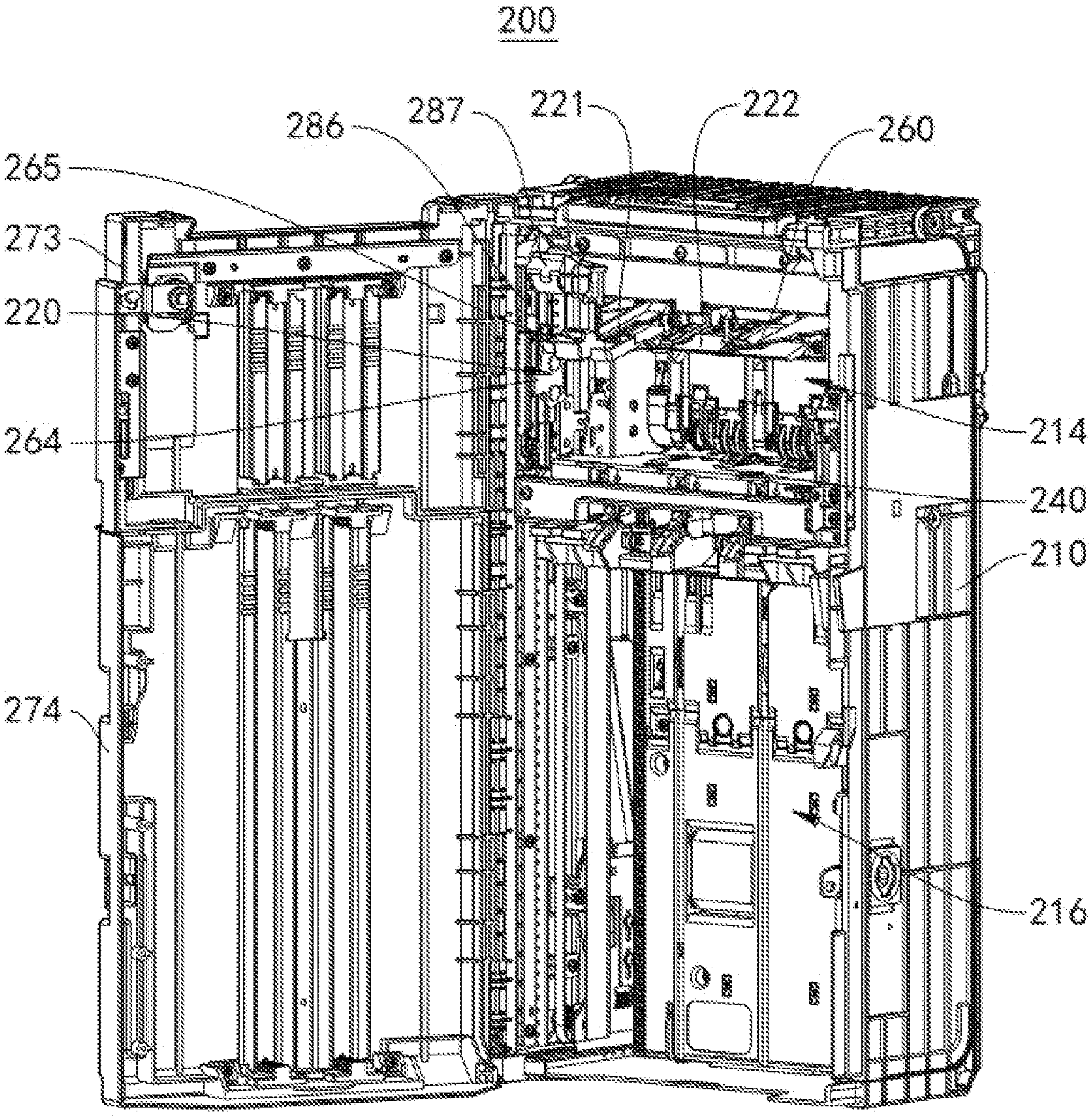
FIG. 5 is a first schematic view showing the structure of a sheet-type medium accumulating and separating device in an embodiment of the present application.
Figure 6:
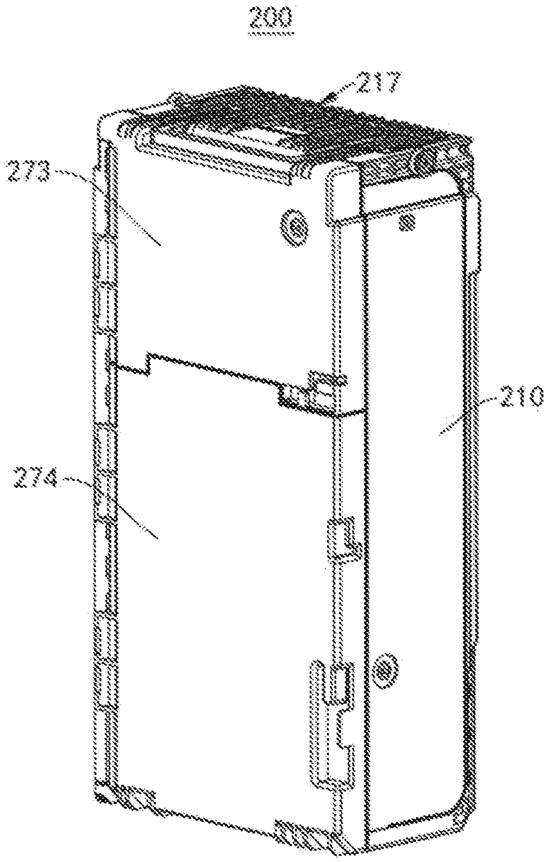
FIG. 6 is a second schematic view showing the structure of a sheet-type medium accumulating and separating device in an embodiment of the present application.

FIG. 5 is a schematic view showing the structure of a sheet-type medium accumulating and separating device 200 in an embodiment of the present application. Optionally, referring to FIG. 5 and FIG. 6, the sheet-type medium accumulating and separating device 200 further includes a first door 273 disposed to close or open an opening of the first storage cavity 214, and a second door 274 disposed to close or open an opening of the second storage cavity 216. The first door 273 and the second door 274 are rotatably connected to the frame 210. With such an arrangement, the first door 273 opens the first storage cavity 214 or the second door 274 opens the second storage cavity 216, thereby facilitating cleaning, filling, maintenance and repair of the first storage cavity 214 and the second storage cavity 216. In other embodiments, the first door 273 and the second door 274 may also be slidably connected to the frame 210 or connected in other ways, which is not specifically limited herein.

Referring to FIG. 4, the sheet-type medium accumulating and separating device 200 further includes a paper input roller 232 disposed at the paper inlet 212, the paper input roller 232 is configured to drive the sheet-type media to enter the first storage cavity 214 via the paper inlet 212. Optionally, the sheet-type medium accumulating and separating device 200 further includes a paper blocking roller 234 and a paper separating roller 233 disposed oppositely at the paper outlet 213. In a direction in which the sheet-type media are output from the first storage cavity 214 via the paper outlet 213, the paper separating roller 233 is located downstream of the paper kicking roller 231, and when to output the sheet-type media stacked on the paper supporting plate 240, the paper blocking roller 234 is disposed to block movement of the sheet-type media not in contact with the paper kicking roller 231 toward the paper outlet 213 so as to output the sheet-type media one by one from the paper outlet 213 by the paper kicking roller 231. The paper input roller 232, the paper kicking roller 231, and the paper separating roller 233 can each be driven to rotate by a driving member such as a motor to drive the sheet-type media to move by the rotating paper input roller 232, the rotating paper kicking roller 231, and the rotating paper separating roller 233.

Referring to FIG. 2, the sheet-type medium accumulating and separating device 200 in this embodiment further includes a guide plate 260, and the guide plate 260 includes a first guide surface 261 configured to guide the sheet-type media entering the first storage cavity 214 via the paper inlet 212 to be stacked on the paper supporting plate 240. When the paper pressing plate 221 is in the second position, the paper pressing part 222 is adjacent to the guide plate 260. Illustratively, a first end of the first guide surface 261 is adjacent to the paper inlet 212, and a second end of the first guide surface 261 extends obliquely in a direction of approaching the paper supporting plate 240. The paper pressing part 222 is located on one side of the first guide surface 261 away from the paper supporting plate 240, or a lower surface of the paper pressing part 222 does not protrude with respect to the first guide surface 261. With such an arrangement, when the paper pressing plate 221 is in the second position, the sheet-type media entering the first storage cavity 214 through the paper inlet 212 can be guided by the first guide surface 261 of the guide plate 260 to be stacked neatly and smoothly on the paper supporting plate 240, and the paper pressing part 222 does not adversely affect the accumulation of the sheet-type media in the first storage cavity 214.

With continued reference to FIG. 2, a first end of the guide plate 260 is rotatably connected to the frame 210, and a second end of the guide plate 260 extends obliquely into the first storage cavity 214. The paper pressing part 222 includes a second guide surface 262. When the paper pressing plate 221 is in the second position, the first guide surface 261 and the second guide surface 262 cooperate with each other to guide together the sheet-type media entering the first storage cavity 214 through the paper inlet 212 to be stacked on the paper supporting plate 240. With such an arrangement, the front end of the sheet-type media entering the first storage cavity 214 through the paper inlet 212 sequentially or simultaneously abuts against the first guide surface 261 and the second guide surface 262, so that the sheet-type media are guided by the coaction of the first guide surface 261 and the second guide surface 262 to be stacked on the paper supporting plate 240, thereby ensuring that the sheet-type media can be stacked on the paper supporting plate 240 neatly and smoothly. In other embodiments according to the present application, an end, adjacent to the guide plate 260, of the paper pressing part 222 is provided with an insertion slot, and the second end of the guide plate 260 is provided with an insertion tooth, the insertion tooth is inserted into the insertion slot so as to ensure that the first guide surface 261 and the second guide surface 262 are seamlessly lap joined, both of which are capable of jointly guiding the sheet-type media to be stacked on the paper supporting plate 240.

Optionally, when the paper pressing plate 221 is in the first position, the second guide surface 262 can also press the sheet-type media stacked on the paper supporting plate 240 against the paper kicking roller 231 to increase the pressure between the paper kicking roller 231 and the sheet-type media, and further increase the friction between the paper kicking roller 231 and the sheet-type media, thereby ensuring the smooth separation and output of the sheet-type media.

In this embodiment, the guide plate 260 is fixedly connected to the frame 210, and in other embodiments according to the present application, the guide plate 260 is rotatably connected to the frame 210 by a pivot shaft (not shown). The guide plate 260 can be fixedly connected to the pivot shaft or rotatably connected to the pivot shaft so long as the guide plate 260 can be rotatably connected to the frame 210 through the pivot shaft, which is not specifically limited herein.

In other embodiments, with continued reference to FIG. 2, the guide plate 260 is further provided with an accommodating groove 263. When the paper pressing plate 221 is in the second position, the paper pressing part 222 is embedded in the accommodating groove 263, in the direction from the guide plate 260 to the paper supporting plate 240, the first guide surface 261 protrudes from the surface of the paper pressing part 222 facing the paper supporting plate 240, and in this embodiment, the first guide surface 261 protrudes from the second guide surface 262. With such an arrangement, when the paper pressing plate 221 is in the second position, the paper pressing part 222 can be prevented from blocking in the path along which the sheet-type media enter the first storage cavity 214 through the paper inlet 212 due to the manufacturing or assembly error, thereby ensuring that the sheet-type media are smoothly stacked on the paper supporting plate 240.

Referring to FIG. 2 and FIG. 3, the paper pressing mechanism 220 further includes a connecting part 264 and a supporting rack 265 located in one side of the first storage cavity 214, the supporting rack 265 is in transmission connection with the driving assembly 250, and the driving assembly 250 is configured to drive the supporting rack 265 to move in the stacking direction. The connecting part 264 is connected to the paper pressing part 222 and is rotatably connected to the supporting rack 265. With such an arrangement, when the sheet-type media stacked on the paper supporting plate 240 are uneven due to warping or folding of the sheet-type media, the paper pressing part 222 of the paper pressing plate 221 in the first position can rotate together with the connecting part 264 with respect to the supporting rack 265, so that the paper pressing plate 221 can be adapted to the un-flatness of the sheet-type media when the paper pressing plate 221 presses against the sheet-type media to allow the sheet-type media to be closely pressed against the paper kicking roller 231, to ensure the pressure between the paper kicking roller 231 and the sheet-type media so as to ensure that the sheet-type media are separated and output, and the sheet-type media can be prevented from being damaged due to the uneven pressure of the paper pressing part 222 on the sheet-type media.

Figure 7:
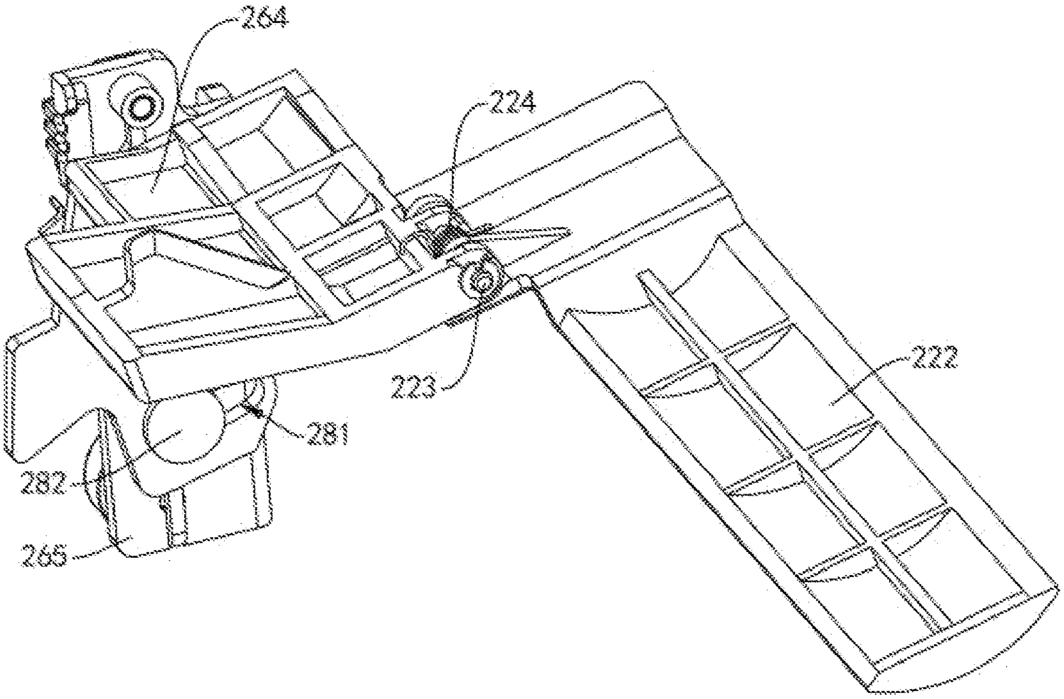
FIG. 7 is a first schematic view showing a partial structure of a paper pressing mechanism according to an embodiment of the present application.

FIG. 7 is a first schematic view showing a partial structure of the paper pressing mechanism 220 in an embodiment of the present application. As shown in FIG. 7, the connecting part 264 is rotatably connected to the paper pressing part 222. Illustratively, the connecting part 264 is rotatably connected to the paper pressing part 222 through a first rotating shaft 223, and the paper pressing mechanism 220 further includes a paper pressing elastic member 224, a first end of the paper pressing elastic member 224 is connected to the paper pressing part 222, a second end of the paper pressing elastic member 224 is connected to the connecting part 264, and the paper pressing elastic member 224 is configured to allow the paper pressing part 222 to have a tendency to rotate in a direction of approaching the paper kicking roller 231. Illustratively, the paper pressing elastic member 224 is configured to allow the paper pressing part 222 to always have a tendency to rotate in the direction of approaching the paper kicking roller 231 until the paper pressing part 222 elastically abuts against the connecting part 264. When the paper pressing plate 221 is in the first position, the paper pressing part 222 can reliably press the sheet-type media on the paper kicking roller 231 under the action of the paper pressing elastic member 224, and when the sheet-type media stacked on the paper supporting plate 240 are uneven due to warping or corner folding of the sheet-type media, the paper pressing part 222 can overcome the elastic force of the paper pressing elastic member 224 and rotate with respect to the connecting part 264, and a high portion of the sheet-type media can push the paper pressing part 222 to rotate towards a low portion of the sheet-type media, to ensure that the paper pressing part 222 can effectively press on the sheet-type media, such that the sheet-type media can be pressed on the paper kicking roller 231 regardless of the high position or the low position, which facilitates ensuring the pressure uniformity when the paper pressing part 222 presses the sheet-type media on the paper kicking roller 231. As a result, it is advantageous to ensure the smooth separation and output of the sheet-type media, to prevent the sheet-type media from being deflected when being separated and output, and to prevent the sheet-type media or the paper pressing plate 221 from being damaged due to the uneven pressure exerted on the sheet-type media by the paper pressing part 222. In addition, compared with the fixed connection of the connecting part 264 to the paper pressing part 222, the elastic abutting of the paper pressing part 222 against the connecting part 264 can avoid the phenomenon that the paper pressing part 222 is hard deformed relative to the connecting part 264 so as to adversely affect the pressing effect of the paper pressing part 222 to the sheet-type media accordingly. In other embodiments, the connecting part 264 may be fixedly connected to the paper pressing part 222 or the connecting part 264 may be integrally formed with the paper pressing part 222, which is not specifically limited herein.

In an embodiment, as shown in FIG. 4, a rotation limiting part 280 is provided between the connecting part 264 and the supporting rack 265, and the rotation limiting part 280 is configured to limit an angle of rotation of the connecting part 264 with respect to the supporting rack 265. Since the connecting part 264 is connected to the paper pressing part 222, the rotation limiting part 280 can also limit the rotation angle of the paper pressing part 222 with respect to the supporting rack 265, that is, limiting the rotation angle of the paper pressing part 222, even if the sheet-type medium accumulating and separating device is inclined and jolted due to accident, the general position of the paper pressing part 222 can be ensured, so that when the driving assembly drives the paper pressing plate 221 to move between the first position and the second position, the paper pressing part 222 can play its paper pressing function in the first position and its guiding function in the second position.

Figure 8:
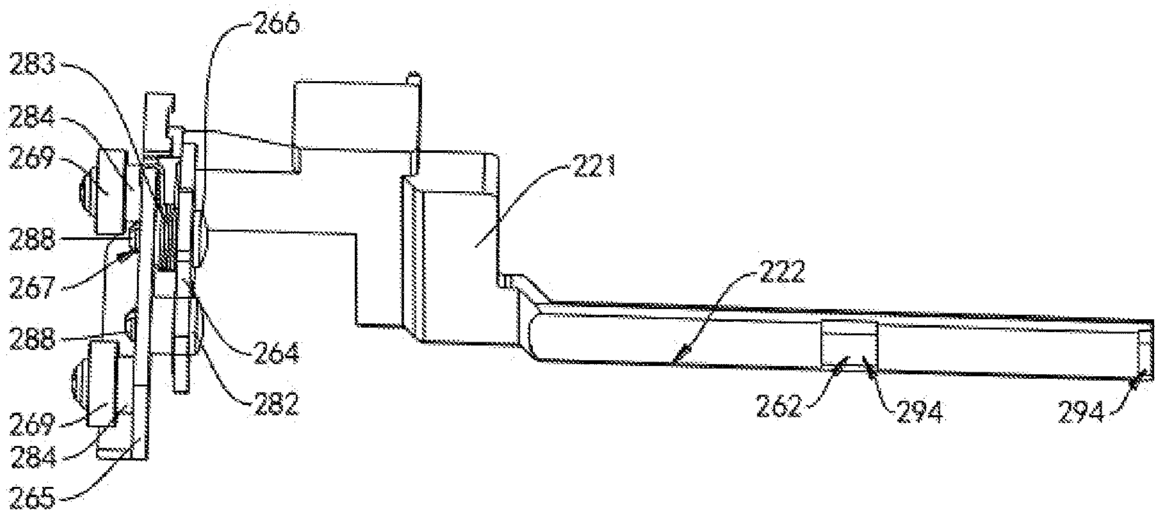
FIG. 8 is a second schematic view showing a partial structure of a paper pressing mechanism according to an embodiment of the present application.

FIG. 8 is a second schematic view showing a partial structure of the paper pressing mechanism 220 according to an embodiment of the present application. Referring to FIG. 8, the connecting part 264 is rotatably connected to the supporting rack 265 through a second rotating shaft 266, and the paper pressing plate 221 can rotate, under the gravity of its own, together with the connecting part 264 with respect to the supporting rack 265, to allow the paper pressing plate 221 to close to the paper kicking roller 231 so as to ensure the stability of the paper pressing part 222 during the movement of the paper pressing plate 221 and the stability of the paper pressing part 222 when pressing against the sheet-type media, and when the sheet-type media stacked on the paper supporting plate 240 remain few, it can be ensured that there is sufficient friction between the paper kicking roller 231 and the sheet-type media to smoothly separate and output the sheet-type media.

Optionally, referring to FIG. 8, the second rotating shaft 266 is fixedly connected to the connecting part 264, the supporting rack 265 is provided with a hole 267, and the second rotating shaft 266 is rotatably inserted through the hole 267. The connection of the second rotating shaft 266 to the connecting part 264 may be integral forming, welding, threaded connection, or the like, which is not specifically limited herein.

In an embodiment, the connecting part 264 may be rotatably connected to the paper pressing plate 221 through the first rotating shaft 223 to allow the connecting part 264 to be rotatably connected to the paper pressing part 222 through the first rotating shaft 223. In some embodiments, the connecting part 264 may be a connecting plate to be integrally formed with the paper pressing plate 221, or the connecting part 264 may be a connecting plate fixedly connected to the paper pressing plate 221 by welding, or engagement, or the like, which is not specifically limited herein.

The frame 210 is provided with a slide slot (not shown) extending in the stacking direction, and with continued reference to FIG. 8, the supporting rack 265 is provided with two rollers 269, and the two rollers 269 are distributed at an interval in the stacking direction, the rollers 269 are located in the slide slot, and the rollers 269 can roll in the length extending direction of the slide slot. With such an arrangement, when the driving assembly 250 drives the supporting rack 265 to move in the stacking direction, it can be ensured that the supporting rack 265 moves stably and smoothly in the stacking direction, thereby driving the paper pressing plate 221 to move stably between the first position and the second position.

In an embodiment, the rollers 269 are rotatably connected to the supporting rack 265 through a roller shaft 284, and the rollers 269 roll along the slide slot to bring the supporting rack 265 to move smoothly in the stacking direction.

The driving assembly 250 may be selected depending on requirements. Referring to FIGS. 4 and FIG. 5, the driving assembly 250 in this embodiment includes two pulleys 285 and a conveyor belt 286 sleeved on the two pulleys 285, the two pulleys 285 are distributed at an interval in the stacking direction, and are rotatably arranged on the frame 210, and the supporting rack 265 is fixedly connected to the conveyor belt 286. The driving assembly 250 further includes a motor 287, and an output shaft of the motor 287 is in transmission connection with one of the pulleys 285. When the output shaft of the motor 287 rotates, the pulley 285 is driven to rotate synchronously, and the conveyor belt 286 is driven to drive the supporting rack 265 to move in the stacking direction, to further drive the paper pressing plate 221 to move between the first position and the second position.

In other embodiments, the driving assembly 250 may further include a gear rack assembly, a lead screw assembly, or the like, which is not specifically limited herein.

Figure 9:
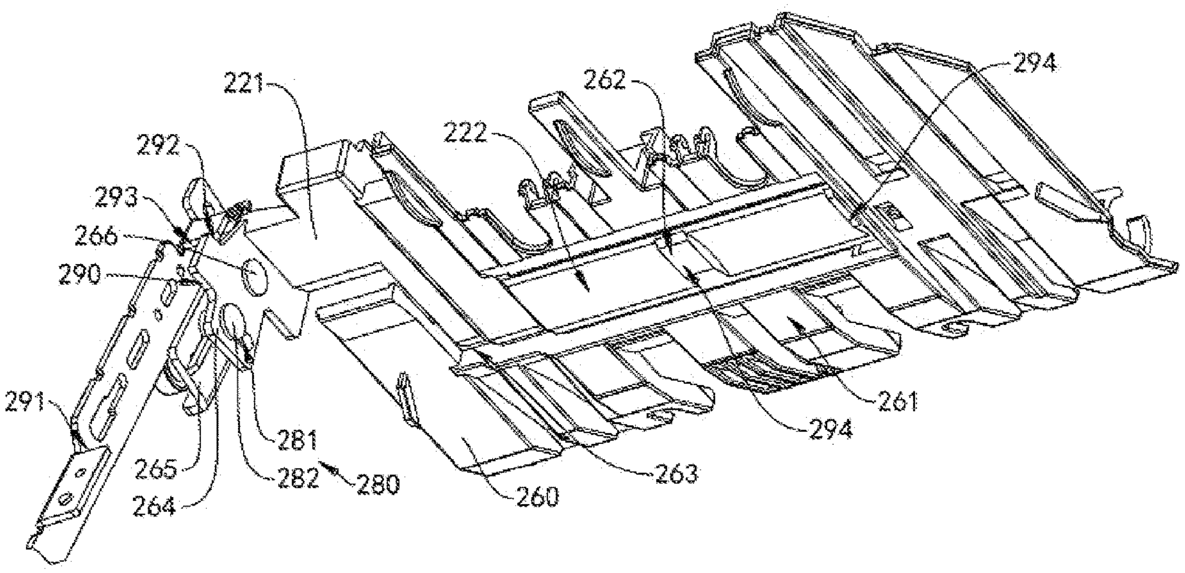
FIG. 9 is a first schematic view showing a partial structure of a sheet-type medium accumulating and separating device in an embodiment of the present application.
Figure 10:
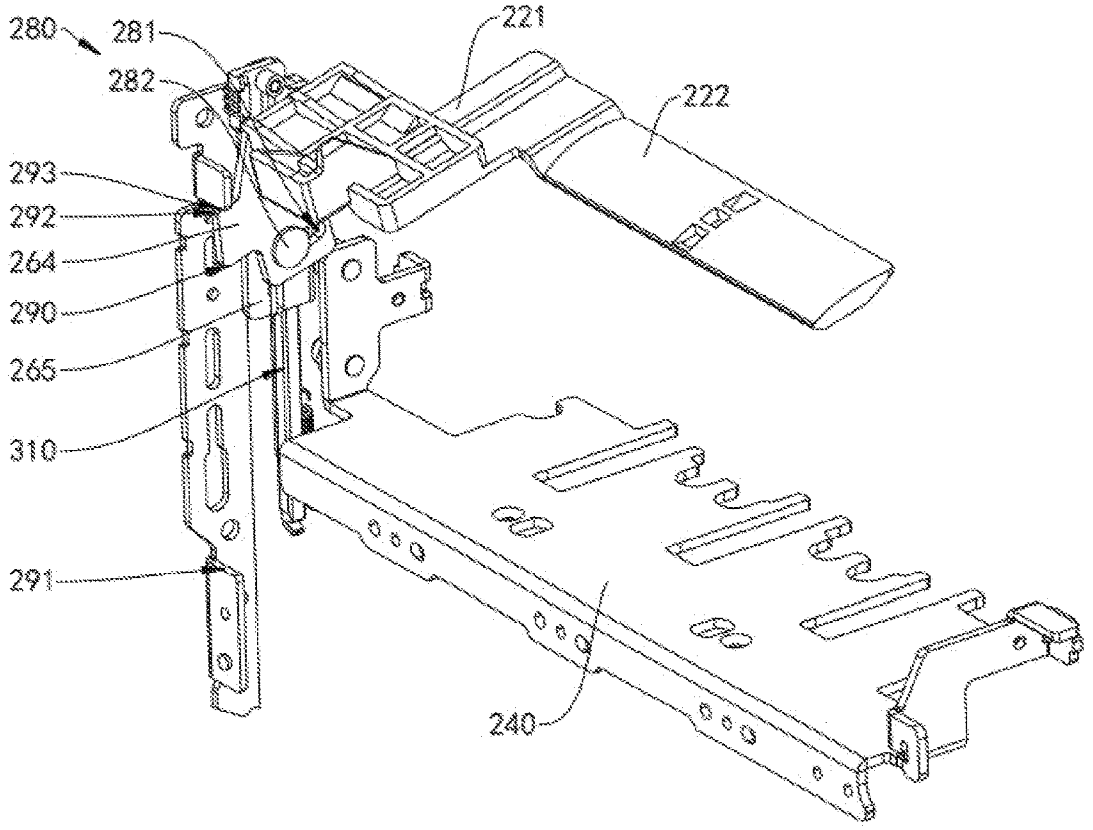
FIG. 10 is a second schematic view showing a partial structure of a sheet-type medium accumulating and separating device in an embodiment of the present application.

FIG. 9 is a first schematic view showing a partial structure of the sheet-type medium accumulating and separating device 200 in an embodiment of the present application; and FIG. 10 is a second schematic view showing a partial structure of the sheet-type medium accumulating and separating device 200 in an embodiment of the present application.

The rotation limiting part 280 may be arranged as required. Optionally, referring to FIG. 8 to FIG. 10, the rotation limiting part 280 includes a position limiting slot 281 and a plunger 282, the position limiting slot 281 is provided in one of the connecting part 264 and the supporting rack 265, the plunger 282 is arranged in the other one of the connecting part 264 and the supporting rack 265, and the plunger 282 is slidably inserted into the position limiting slot 281 and is slidable in the position limiting slot 281. The paper pressing mechanism 220 further includes a first elastic member 283, a first end of the first elastic member 283 is connected to one of the paper pressing part 222 and the connecting part 264, a second end of the first elastic member 283 is connected to the supporting rack 265, and the first elastic member 283 is configured to allow the plunger 282 to abut against one end of the position limiting slot 281, to enable the second guide surface 262 of the paper pressing part 222 to be arranged inclined when the paper pressing plate 221 is in the second position, so as to guide the sheet-type media to be stacked on the paper supporting plate 240. With such an arrangement, when the paper pressing plate 222 is in the second position, the gravity of the paper pressing part 222 can be overcome under the elastic action of the first elastic member 283, the paper pressing part 222 rotates to allow the second guide surface 262 to be inclined, and an end of the second guide surface 262 close to the paper inlet 212 is higher than an end of the second guide surface 262 far from the paper inlet 212, to thereby enabling the second guide surface 262 of the paper pressing part 222 to guide the sheet-type media to be stacked on the paper supporting plate 240. In other embodiments, when the paper pressing plate 221 is in the second position, the paper pressing part 222 may further be embedded into the accommodating groove 263 of the guide plate 260 by the elasticity of the first elastic member 283, thereby preventing the paper pressing plate 221 in the second position from interfering with the sheet-type media entering the first storage cavity 214 through the paper inlet 212.

In this embodiment, the plunger 282 is fixedly connected to the supporting rack 265, and the position limiting slot 281 is provided in the connecting part 264. Illustratively, the plunger 282 may be connected to the supporting rack 265 by a fastener such as a bolt, or the plunger 282 may also be plugged, welded or engaged to the supporting rack 265. In other embodiments, the plunger 282 may be fixedly connected to the connecting part 264, and the position limiting slot 281 may be provided in the supporting rack 265.

In this embodiment, the first end of the first elastic member 283 is connected to the connecting part 264, and the second end of the first elastic member 283 is connected to the supporting rack 265, that is, the first elastic member 283 is connected between the connecting part 264 and the supporting rack 265. When the paper pressing plate 221 is in the second position, the plunger 282 abuts against one end of the position limiting slot 281 under the elastic action of the first elastic member 283, to allow the paper pressing part 222 to be embedded into the accommodating groove 263, and the second guide surface 262 cooperates with the first guide surface 261 of the paper pressing plate 260, to guide together the sheet-type media entering the first storage cavity 214 via the paper inlet 212 to be stacked on the paper supporting plate 240. In other embodiments, the first elastic member 283 may also be connected between the paper pressing plate 221 and the supporting rack 265.

The first elastic member 283 may be selected depending on requirements. Optionally, the first elastic member 283 is a torsion spring, the torsion spring is sleeved on the second rotating shaft 266, a first torsion arm of the torsion spring is connected to the supporting rack 265, and a second torsion arm of the torsion spring is connected to the connecting part 264. The torsion spring is configured to drive the plunger 282 to abut against one end of the position limiting slot 281, and drive the paper pressing part 222 of the paper pressing plate 221 in the second position to be embedded in the accommodating groove 263. In other embodiments, the first torsion arm of the torsion spring is capable of being connected to the supporting rack 265, and the second torsion arm of the torsion spring is connected to the paper pressing plate 221. In other embodiments, the first elastic member 283 may further be a tension spring or the like.

The above position limiting slot 281 is an arc slot, and the center of the arc slot is located on the axis of the second rotating shaft 266. With such an arrangement, the maximum rotation angle of the paper pressing part 222 can be limited while the paper pressing part 222 and the connecting part 264 rotate about the second rotating shaft 266 with respect to the supporting rack 265, and further, when the paper pressing plate 221 is in the first position, it is ensured that the paper pressing part 222 can press against the sheet-type media stacked on the paper supporting plate 240, to allow the friction between the paper kicking roller 231 and the sheet-type media to be increased, and even if the sheet-type media on the paper supporting plate 240 remain few, the sheet-type media can be smoothly separated and output. In an embodiment, when the paper pressing plate 221 is in the first position, if the sheet-type media stacked on the paper supporting plate 240 are uneven in surface, a high portion of the sheet-type media can push the paper pressing plate 221 to rotate towards a low portion of the sheet-type media, so as to ensure that the paper pressing plate 221 can effectively press against the sheet-type media, and that the sheet-type media can be pressed against the paper kicking roller 231 regardless of the high position or the low position, to ensure that there is sufficient friction between the paper kicking roller 231 and the sheet-type media to enable the sheet-type media to be separated and output by the paper kicking roller 231, and that the sheet-type media are prevented from being damaged due to the uneven pressure applied by the paper pressing part 222 on the sheet-type media. Optionally, referring to FIG. 8, an end portion of the plunger 282 and an end portion of the second rotating shaft 266 are each provided with a resilient hook part 288 which cooperates with the supporting rack 265 by engagement. When to mount or dismount the plunger 282 and the second rotating shaft 266 to the supporting rack 265, the resilient hook part 288 arranged on the plunger 282 is deformed under the action of an external force, thus, the resilient hook part 288 arranged on the plunger 282 can be driven to pass through the position limiting slot 281, so that the plunger 282 can be mounted or dismounted to the position limiting slot 281, similarly, the resilient hook part 288 arranged on the second rotating shaft 266 is deformed under the action of an external force, that is, the resilient hook part 288 arranged on the second rotating shaft 266 can be driven to pass through the hole 267 so as to mount or dismount the second rotating shaft 266 to the hole 267. In an embodiment, when the plunger 282 and the second rotating shaft 266 are mounted to the supporting rack 265 by the resilient hook parts 288 arranged corresponding thereto, the resilient hook parts 288 can abut against and be fitted to the supporting rack 265, and when there is no external force to deform the resilient hook parts 288, the plunger 282 and the second rotating shaft 266 are not prone to being accidentally separated from the supporting rack 265, thereby, the stability of the assembling of the plunger 282 and the second rotating shaft 266 to the supporting rack 265 can be maintained by the resilient hook parts 288.

Optionally, the resilient hook parts 288 may be connected to the plunger 282 and the second rotating shaft 266 in a manner such as adhesive bonding or snap-connection/engagement or the like, which is not specifically limited herein.

With continued reference to FIG. 9 and FIG. 10, the paper pressing plate 221 of this embodiment further includes a paper pressing positioning part 290, and the frame 210 is further provided with a paper pressing limiting part 291, and when the paper pressing plate 221 moves towards the paper kicking roller 231, the paper pressing limiting part 291 can abut against the paper pressing positioning part 290 to prevent the paper pressing plate 221 from moving further towards the paper kicking roller 231. With such an arrangement, when the sheet-type media on the paper supporting plate 240 remain few, the pressure of the paper pressing plate 221 in pressing the paper kicking roller 231 can be prevented from being too large when the paper pressing plate 221 moves towards the paper kicking roller 231, causing overload of the pressure of the paper kicking roller 231, or to prevent collision between the paper pressing plate 221 and the paper supporting plate 240 and the damage caused thereby.

Optionally, the paper pressing positioning part 290 is provided at the connecting part 264. With such an arrangement, the paper pressing part 222 can be prevented from being damaged, which ensures the reliability of the pressing applied by the paper pressing part 222 onto the sheet-type media stacked on the paper supporting plate 240.

With continued reference to FIG. 9 and FIG. 10, the paper pressing plate 221 further includes a paper inputting positioning part 292, and the frame 210 is further provided with a paper inputting limiting part 293. When the paper pressing plate 221 moves in a direction away from the paper kicking roller 231, the paper inputting limiting part 293 can abut against the paper inputting positioning part 292. Optionally, when the paper inputting limiting part 293 abuts against the paper inputting positioning part 292, driven by the driving assembly, the paper pressing part 222 can rotate, to allow the second guide surface 262 to be in an inclined state and match an inclination angle of the first guide surface 261 of the guide plate 260, and further ensure that the paper pressing plate 221 is maintained in the second position, thereby facilitating the smooth stacking of the sheet-type media on the paper supporting plate 240 under the joint guidance of the first guide surface 261 and the second guide surface 262 after the sheet-type media enter the first storage cavity 214 through the paper inlet 212.

Optionally, the paper inputting positioning part 292 is provided on the connecting part 264, with such an arrangement, interference with the stacking of the sheet-type media entering the first storage cavity 214 via the paper inlet 212 on the paper supporting plate 240 can be avoided.

Referring to FIG. 8 and FIG. 9, the paper pressing part 222 of this embodiment is provided with a boss 294, and the boss 294 is arranged opposite to the paper kicking roller 231. With such an arrangement, the sheet-type media stacked on the paper supporting plate 240 can be effectively pressed by the boss 294, thereby increasing the strength of compression to the sheet-type media, and further facilitating ensuring reliable separation and output of the sheet-type media.

Optionally, referring to FIG. 8 to FIG. 10, the connecting part 264 and the paper pressing part 222 are connected at an angle, and in an axial direction of the paper kicking roller 231, the connecting part 264 is located on one side of the paper kicking roller 231, the length of the paper pressing part 222 extends in the axial direction of the paper kicking roller 231, and the cross section of the paper pressing part 222 is configured in an arc shape. With such an arrangement, the space occupied by the paper pressing part 222 and the connecting part 264 as an integral part in the first storage cavity 214 can be reduced, and the strength of the paper pressing part 222 can be increased through the configuration of the arc-shaped cross section of the paper pressing part 222; the length of the paper pressing part 222 configured as extending in the axial direction of the paper kicking roller 231 can utilize the paper pressing part 222 in the first position to stably press the sheet-type media stacked on the paper supporting plate 240.

In an embodiment, the included angle between the connecting part 264 and the paper pressing part 222 may be selected as required, for example, may be 90°, or 100°, which is not specifically limited herein.

Figure 11:
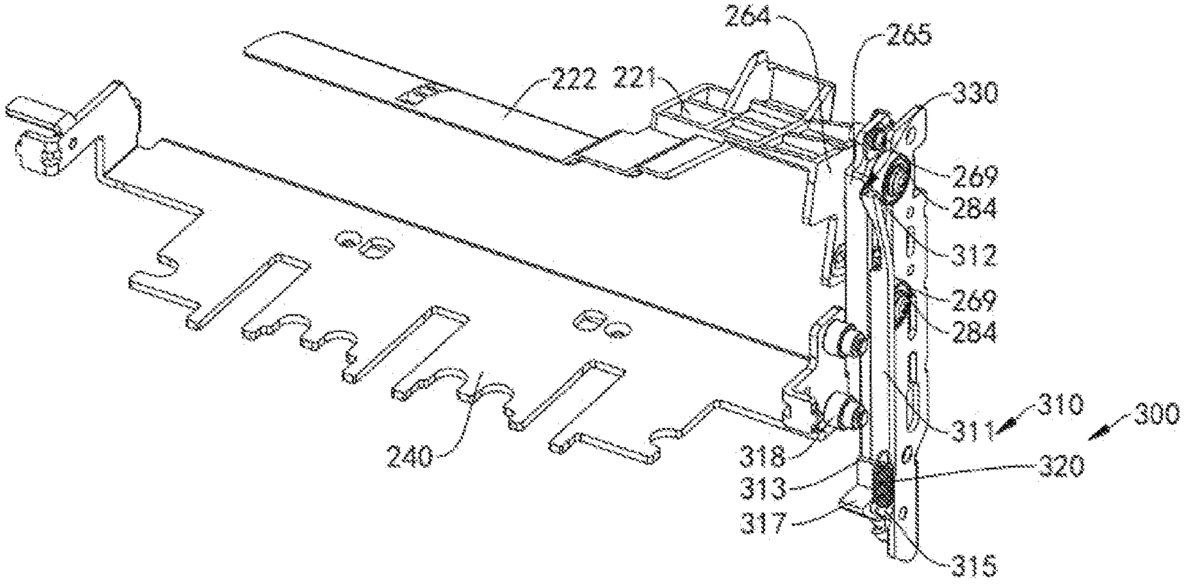
FIG. 11 is a third schematic view showing a partial structure of a sheet-type medium accumulating and separating device in an embodiment of the present application.
Figure 12:
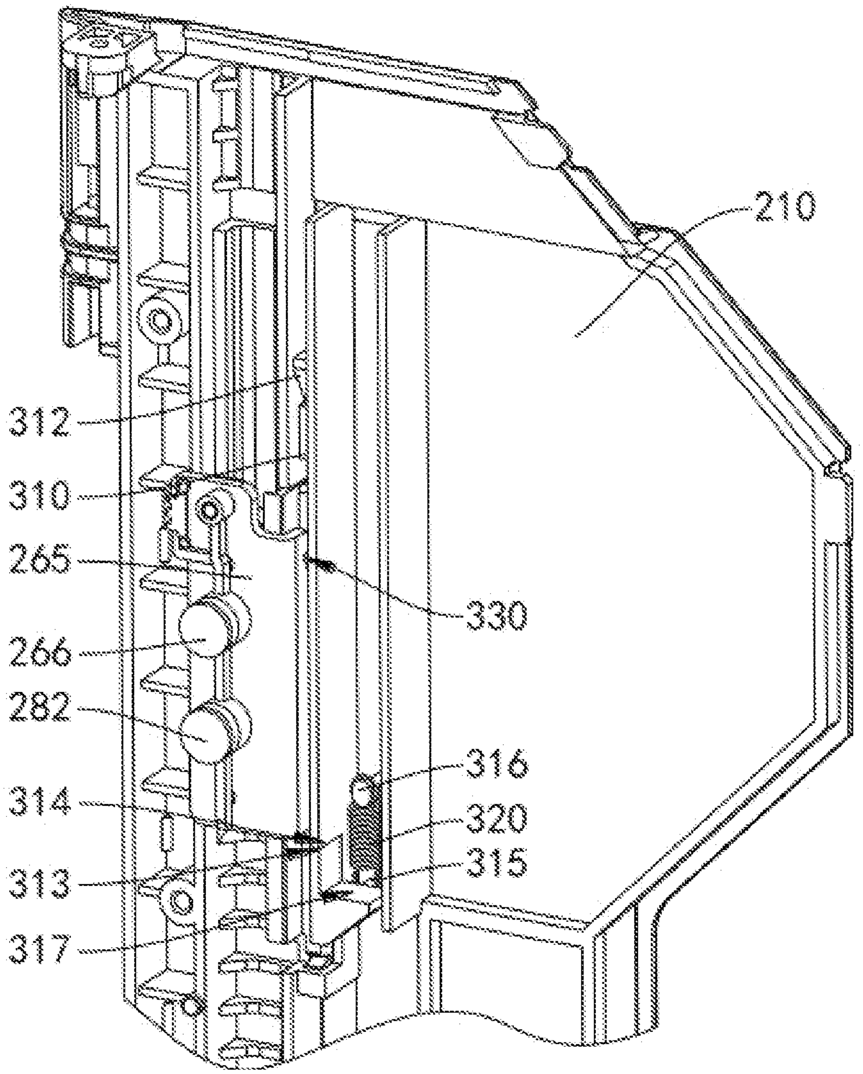
FIG. 12 is a fourth schematic view showing a partial structure of a sheet-type medium accumulating and separating device in an embodiment of the present application.

FIG. 11 is a third schematic view showing a partial structure of a sheet-type medium accumulating and separating device 200 in an embodiment of the present application; and FIG. 12 is a fourth schematic view showing a partial structure of a sheet-type medium accumulating and separating device 200 in an embodiment of the present application.

Referring to FIG. 11, the paper pressing mechanism 220 according to this embodiment further includes a locking assembly 300, the locking assembly 300 is configured to lock the paper pressing plate 221 in the second position to ensure that the sheet-type media can enter the first storage cavity 214 via the paper inlet 212 and be stacked on the paper supporting plate 240, and the second guide surface 262 of the paper pressing part 222 can further guide the direction of movement of the sheet-type media to allow the sheet-type media to be stacked neatly on the paper supporting plate 240. The locking assembly 300 includes a locking member 310 and a second elastic member 320, the locking member 310 is movably connected to the frame 210 and has a locking position and an avoidance position. When the locking member 310 is in the locking position, the locking member 310 cooperates with the paper pressing plate 221 in the second position to lock the position of the paper pressing plate 221; and when the locking member 310 is in the avoidance position, the locking member 310 is separated from the paper pressing plate 221, and the paper pressing plate 221 in the second position can be driven by the driving assembly 250 to move toward the first position. The second elastic member 320 is connected between the frame 210 and the locking member 310 and is configured to allow the locking member 310 to always have a tendency to move toward the locking position. With such an arrangement, when the paper pressing plate 221 is required to be in the second position, the locking assembly 300 may be utilized to stably lock the paper pressing plate 221 in the second position, thereby, ensuring the stability of the position of the paper pressing plate 221 when the sheet-type medium accumulating and separating device 200 has paper input, preventing the paper pressing plate 221 from interfering with the entering of the sheet-type media into the first storage cavity 214 via the paper inlet 212, and preventing the paper pressing plate 221 from interfering with the stacking of the sheet-type media entering the first storage cavity 214 via the paper inlet 212 on the paper supporting plate 240. Utilizing the locking assembly 300 to stably lock the paper pressing plate 221 in the second position may further prevent the paper pressing plate 221 from shaking or colliding with the frame 210 or the like during transport or maintenance of the sheet-type medium accumulating and separating device 200. In this embodiment, the locking member 310 is slidably connected to the frame 210, and is movable between the locking position and the avoidance position. In other embodiments, the locking member 310 is rotatably connected to the frame 210, and is rotatable between the locking position and the avoidance position.

Optionally, referring to FIG. 11 and FIG. 12, the locking member 310 is provided with a locking positioning part 313, and the frame 210 is further provided with a locking limiting part 314. When the locking member 310 is in the locking position, the locking positioning part 313 abuts against and is fitted with the locking limiting part 314. Under the elastic action of the second elastic member 320, the locking positioning part 313 always has a tendency to abut against and be fitted with the locking limiting part 314. With such an arrangement, the stability of the locking member 310 in the locking position can be ensured, thereby ensuring the stability of the paper pressing plate 221 in the second position.

The specific manner in which the second elastic member 320 is connected between the frame 210 and the locking member 310 may be selected as required. Optionally, referring to FIG. 12, the locking member 310 is provided with a first post 315, which is arranged adjacent to the locking positioning part 313, and the frame 210 is provided with a second post 316, and two ends of the second elastic member 320 are connected to the first post 315 and the second post 316, respectively.

The second elastic member 320 may be selected as required, and the second elastic member 320 of this embodiment is a tension spring. In other embodiments, the second elastic member 320 may also be an elastic cord, an elastic adhesive tape, or the like, which is not specifically limited herein.

Referring to FIG. 12, the supporting rack 265 described above is provided with a retaining slot 330, the locking member 310 includes a locking body 311 and a resilient snap-hook 312, the frame 210 is further provided with an elongated slot extending in the stacking direction, the locking body 311 is embedded in the elongated slot and is inserted to be slidably connected to the elongated slot and is slidable in the elongated slot, and the resilient snap-hook 312 is provided on the locking body 311 and is deformable with respect to the locking body 311. When the paper pressing plate 221 is in the second position and the locking member 310 is in the locking position, the resilient snap-hook 312 is snap-fitted with the retaining slot 330. When it is required to unlock the paper pressing plate 221, the locking member 310 is moved toward the avoidance position by an external force, and the resilient snap-hook 312 is deformed and separated from the retaining slot 330, that is, the locking member 310 can be unlocked and switched to the avoidance position, to allow the locking member 310 to be separated from the paper pressing plate 221. The first post 315 is fixedly connected to the second end of the locking body 311, and the first post 315 may be fixedly connected to the locking member 310 by welding, engagement or threaded connection or the like, which is not specifically limited herein. With such an arrangement, the locking member 310 can be stably held in the locking position by the resilient snap-hook 312. In addition, when it is required to unlock the locking member 310, the resilient snap-hook 312 can be directly deformed to separate the resilient snap-hook 312 from the retaining slot 330 when the locking member 310 moves toward the avoidance position under the external force, thereby improving the unlocking efficiency of the locking member 310. Moreover, the locking body 311 is embedded in the elongated slot and can slide along the elongated slot between the locking position and the avoidance position, and the structure is compact, thereby facilitating a miniaturized design of the sheet-type medium accumulating and separating device 200.

Optionally, the resilient snap-hook 312 can be fixedly connected to the locking body 311 by adhesive connection, engagement, threaded connection, or the like, and in this embodiment, the resilient snap-hook 312 and the locking body 311 are integrally formed.

In this embodiment, the paper supporting plate 240 is movably connected to the frame 210, and the paper supporting plate 240 is movable in the stacking direction, and has a paper output position close to the paper outlet 213 and a paper receiving position close to the paper inlet 212. When the paper supporting plate 240 is in the paper output position, the paper kicking roller 231 is in contact with the sheet-type media on the paper supporting plate 240 through the opening in the paper supporting plate 240. When the paper supporting plate 240 is in the paper receiving position, an upper surface of the paper supporting plate 240 (the upper surface of the uppermost sheet-type medium if the paper supporting plate 240 has sheet-type media stacked thereon) is spaced from the second guide surface 262 of the paper pressing plate 221 in the second position, and a stacking space of the sheet-type media entering via the paper inlet 212 is formed therebetween. When the paper supporting plate 240 is moved from the paper receiving position to the paper output position, the paper supporting plate 240 can cooperate with the locking body 311 and drive the locking member 310 to move to the avoidance position, thereby releasing the position locking to the paper pressing plate 221 and enabling the driving assembly to drive the paper pressing plate 221 to move to the first position. With such an arrangement, the movement of the paper supporting plate 240 can be utilized to directly drive the locking member 310 to unlock, without requiring to additionally provide a power device for the locking member 310 to unlock the locking member 310, thereby facilitating simplification of the structure of the sheet-type medium accumulating and separating device 200 and reducing the cost. Unlocking the locking member 310 can also improve the efficiency of separating the sheet-type media by the sheet-type medium accumulating and separating device 200 during movement of the paper supporting plate 240 to the paper output position.

Optionally, referring to FIG. 11 and FIG. 12, the locking body 311 is provided with an unlocking positioning part 317, and the paper supporting plate 240 is provided with an unlocking limiting part 318. When the paper supporting plate 240 is moved toward the paper output position, the unlocking limiting part 318 can abut against the unlocking positioning part 317 to drive the locking body 311 to slide in the extending direction of the elongated slot, to allow the resilient snap-hook 312 to be deformed due to being blocked, and be separated from the retaining slot 330, and further unlock the locking member 310, to allow the locking member 310 to be moved to the avoidance position. With such an arrangement, it can be ensured that when a power device for driving the locking member 310 to the avoidance position is not separately provided for the locking member 310, the unlocking positioning part 317 and the unlocking limiting part 318 cooperating with each other can be utilized to ensure that the locking member 310 in the locking position can be unlocked and can be switched to the avoidance position.

In an embodiment, the paper receiving position of the paper supporting plate 240 may refer to the position of the paper supporting plate 240 when the paper supporting plate 240 moves towards the guide plate 260 to allow the sheet-type media entering the first storage cavity 214 via the paper inlet 212 to be stacked on the paper supporting plate 240 under the guide of the guide plate 260; and the paper output position of the paper supporting plate 240 may refer to the position of the paper supporting plate 240 when the paper supporting plate 240 moves towards the paper outlet 213 to allow the sheet-type media stacked on the paper supporting plate 240 to be output from the paper outlet 213 under the drive of the paper kicking roller 231.

In an embodiment, the paper supporting plate 240 can be driven by a conveyor belt assembly, a lead screw assembly, a gear rack assembly, or the like, which is not specifically limited herein.

According to the sheet-type medium accumulating and separating device 200 provided in the cash recycling and processing apparatus 010 of this embodiment, when to separate and output the sheet-type media in the first storage cavity 214, the paper supporting plate 240 can be driven to move to the paper output position, during which, the lock to the position of the paper pressing plate 221 is released, and the paper pressing plate 221 is driven to move to the first position, so that the sheet-type media on the paper supporting plate 240 are pressed by the paper pressing part 222, and finally the paper kicking roller 231 rotates, thus, even if few sheet-type media remain on the paper supporting plate 240, the friction between the paper kicking roller 231 and the sheet-type media can be increased, thereby enabling the paper kicking roller 231 to smoothly separate and output the sheet-type media.

In view of the above, the sheet-type medium accumulating and separating device 200 according to this embodiment can be applied to the cash recycling and processing apparatus 010. When the sheet-type medium accumulating and separating device 200 separates and outputs banknotes, the paper pressing plate 221 can be in the first position, and the paper pressing plate 221 is used for pressing the banknotes to increase the pressure between the paper kicking roller 231 and the banknotes so as to increase the friction between the paper kicking roller 231 and the banknotes, thereby ensuring that the separation of the banknotes can be carried out normally. Even when the banknotes on the paper supporting plate 240 remain few, it can be ensured that the friction between the paper kicking roller 231 and the banknotes is increased under the action of the paper pressing plate 221 in the first position, and further the remained few banknotes can be separated and output smoothly.

The sheet-type medium accumulating and separating device 200 according to the embodiments of the present application includes the frame 210 and the paper pressing mechanism 220. The frame 210 is provided with the storage cavity for accommodating the sheet-type media, in the stacking direction of the sheet-type media in the storage cavity, the first end of the first storage cavity 214 is provided with the paper inlet 212, the second end of the first storage cavity 214 is provided with the paper outlet 213 and the paper kicking roller 231, and the paper supporting plate 240 for supporting the sheet-type media is further provided in the storage cavity. The paper pressing mechanism 220 includes the paper pressing plate 221 and the driving assembly 250. The paper pressing plate 221 has the first position and the second position arranged in the stacking direction, and the paper pressing plate 221 includes the paper pressing part 222 arranged in the storage cavity. The driving assembly 250 is mounted to the frame 210 and is in transmission connection with the paper pressing plate 221, and the driving assembly 250 is configured to drive the paper pressing plate 221 to move between the first position and the second position. When the paper pressing plate 221 is in the first position, the paper pressing plate 222 is adjacent to the paper outlet 213 to press the sheet-type media toward the paper kicking roller 231; and when the paper pressing plate 221 is in the second position, the paper pressing part 222 is adjacent to the paper inlet 212. In this way, when to output the paper, the paper pressing plate 221 is driven to be located in the first position to press the sheet-type media, to increase the pressure between the paper kicking roller 231 and the sheet-type media so as to increase the friction between the paper kicking roller 231 and the sheet-type media, thereby ensuring that the separating and outputting of the sheet-type media can be performed normally, and even if the sheet-type media on the paper supporting plate 240 remain few, a sufficient large friction between the paper kicking roller 231 and the sheet-type media can be ensured under the action of the paper pressing plate 221 located in the first position, thereby, the remained few sheet-type media can be separated and output smoothly.

The cash recycling and processing apparatus 010 according to an embodiment of the present application includes the sheet-type medium accumulating and separating device 200 described above. Even if there are few banknotes to be separated in the cash recycling and processing apparatus 010, the sheet-type medium accumulating and separating device 200 can be used to ensure normal operation of separation and output of the banknotes.

What is claimed is:

1. A sheet-type medium accumulating and separating device, comprising a frame and a paper pressing mechanism, wherein the frame is provided with an storage cavity for accommodating sheet-type media, in a stacking direction of the sheet-type media in the storage cavity, a paper inlet is provided at a first end of the storage cavity, a paper outlet and a paper kicking roller are provided at a second end of the storage cavity, and a paper supporting plate for supporting the sheet-type media is further provided in the storage cavity; and the paper pressing mechanism comprises a paper pressing plate and a driving assembly, wherein the paper pressing plate has a first position and a second position arranged in the stacking direction, the paper pressing plate comprises a paper pressing part located within the storage cavity, the driving assembly is mounted to the frame and is in transmission connection with the paper pressing plate, and the driving assembly is configured to drive the paper pressing plate to move between the first position and the second position; when the paper pressing plate is in the first position, the paper pressing part is adjacent to the paper outlet to press sheet-type media towards the paper kicking roller; and when the paper pressing plate is in the second position, the paper pressing part is adjacent to the paper inlet;

wherein the sheet-type medium accumulating and separating device further comprises a guide plate, wherein the guide plate comprises a first guide surface, and the first guide surface is configured to guide sheet-type media entering the storage cavity via the paper inlet to be stacked on the paper supporting plate; and when the paper pressing plate is in the second position, the paper pressing part is adjacent to the guide plate;

wherein the guide plate is provided with an accommodating groove; when the paper pressing plate is in the second position, the paper pressing part is embedded within the accommodating groove, and in a direction from the guide plate to the paper supporting plate, the first guide surface protrudes from a surface of the paper pressing part facing the paper supporting plate.

2. The sheet-type medium accumulating and separating device according to claim 1, wherein a first end of the guide plate is rotatably connected to the frame, and a second end of the guide plate extends obliquely into the storage cavity; the paper pressing part comprises a second guide surface; when the paper pressing plate is in the second position, the first guide surface and the second guide surface cooperate with each other to guide sheet-type media entering the storage cavity via the paper inlet to be stacked on the paper supporting plate.

3. The sheet-type medium accumulating and separating device according to claim 1, wherein the paper pressing mechanism further comprises a connecting part and a supporting rack which are located on one side of the storage cavity, the supporting rack is in transmission connection with the driving assembly, the driving assembly is configured to drive the supporting rack to move in the stacking direction; the connecting part is connected to the paper pressing part and is rotatably connected to the supporting rack, a rotation limiting part is provided between the connecting part and the supporting rack, and the rotation limiting part is configured to limit an angle of rotation of the connecting part with respect to the supporting rack.

4. The sheet-type medium accumulating and separating device according to claim 3, wherein the rotation limiting part comprises a position limiting slot and a plunger, the position limiting slot is provided in one of the connecting part and the supporting rack, the plunger is arranged in another one of the connecting part and the supporting rack; the plunger is slidably inserted into the position limiting slot; and the paper pressing mechanism further comprises a first elastic member, a first end of the first elastic member is connected to one of the paper pressing part and the connecting part, a second end of the first elastic member is connected to the supporting rack, the first elastic member is configured to allow the plunger to abut against one end of the position limiting slot, so as to allow the paper pressing part to guide sheet-type media to be stacked on the paper supporting plate when the paper pressing plate is in the second position.

5. The sheet-type medium accumulating and separating device according to claim 3, wherein the paper pressing part is rotatably connected to the connecting part, the paper pressing mechanism further comprises a paper pressing elastic member, a first end of the paper pressing elastic member is connected to the paper pressing part, a second end of the paper pressing elastic member is connected to the connecting part, and the paper pressing elastic member is configured to allow the paper pressing part to have a tendency to rotate towards the paper kicking roller.

6. The sheet-type medium accumulating and separating device according to claim 1, wherein the paper pressing plate further comprises a paper pressing positioning part, the frame is further provided with a paper pressing limiting part, and when the paper pressing plate moves towards the paper kicking roller, the paper pressing limiting part is capable of abutting against the paper pressing positioning part, to prevent the paper pressing plate from continuing to move towards the paper kicking roller.

7. The sheet-type medium accumulating and separating device according to claim 1, wherein the paper pressing mechanism further comprises a locking assembly configured to lock the paper pressing plate in the second position; the locking assembly comprises a locking member and a second elastic member, and the locking member is movably connected to the frame and has a locking position and an avoidance position;

when the locking member is in the locking position, the locking member cooperates with the paper pressing plate in the second position, to lock the position of the paper pressing plate; and when the locking member is in the avoidance position, the locking member is separated from the paper pressing plate, and the paper pressing plate in the second position is capable of being driven by the driving assembly to move towards the first position; and the second elastic member is connected between the frame and the locking member, and is configured to allow the locking member to have a tendency to move toward the locking position.

8. The sheet-type medium accumulating and separating device according to claim 7, wherein the paper pressing mechanism further comprises a supporting rack in one side of the storage cavity, the paper pressing plate is connected to the supporting rack, the driving assembly is in transmission connection with the supporting rack, and the driving assembly is configured to drive the supporting rack to move in the stacking direction; and the supporting rack is provided with a retaining slot, the locking member comprises a locking body and a resilient snap-hook, the frame is further provided with an elongated slot extending in the stacking direction, the locking body is slidably inserted into the elongated slot, the resilient snap-hook is arranged on the locking body and is deformable with respect to the locking body; when the paper pressing plate is in the second position and the locking member is in the locking position, the resilient snap-hook is snap-fitted with the retaining slot; when it is required to unlock the paper pressing plate, the locking member is moved toward the avoidance position by an external force, and the resilient snap-hook is deformed and separated from the retaining slot.

9. The sheet-type medium accumulating and separating device according to claim 8, wherein the paper supporting plate is movably connected to the frame, and the paper supporting plate is movable in the stacking direction, the paper supporting plate has a paper output position adjacent to the paper outlet, and a paper receiving position adjacent to the paper inlet; when the paper supporting plate is moved from the paper receiving position to the paper output position, the paper supporting plate is capable of abutting against the locking body, and driving the locking member to move to the avoidance position.

10. A cash recycling and processing apparatus, comprising at least one of a banknote input device, a banknote output device, a temporary storage device and a banknote box, wherein each of the banknote input device, the banknote output device, the temporary storage device, and the banknote input device comprises the sheet-type medium accumulating and separating device according to claim 1.

11. The cash recycling and processing apparatus according to claim 10, wherein a first end of the guide plate is rotatably connected to the frame, and a second end of the guide plate extends obliquely into the storage cavity; the paper pressing part comprises a second guide surface; when the paper pressing plate is in the second position, the first guide surface and the second guide surface cooperate with each other to guide sheet-type media entering the storage cavity via the paper inlet to be stacked on the paper supporting plate.

12. The cash recycling and processing apparatus according to claim 10, wherein the paper pressing mechanism further comprises a connecting part and a supporting rack which are located on one side of the storage cavity, the supporting rack is in transmission connection with the driving assembly, the driving assembly is configured to drive the supporting rack to move in the stacking direction; the connecting part is connected to the paper pressing part and is rotatably connected to the supporting rack, a rotation limiting part is provided between the connecting part and the supporting rack, and the rotation limiting part is configured to limit an angle of rotation of the connecting part with respect to the supporting rack.

13. The cash recycling and processing apparatus according to claim 12, wherein the rotation limiting part comprises a position limiting slot and a plunger, the position limiting slot is provided in one of the connecting part and the supporting rack, the plunger is arranged in another one of the connecting part and the supporting rack; the plunger is slidably inserted into the position limiting slot; and the paper pressing mechanism further comprises a first elastic member, a first end of the first elastic member is connected to one of the paper pressing part and the connecting part, a second end of the first elastic member is connected to the supporting rack, the first elastic member is configured to allow the plunger to abut against one end of the position limiting slot, so as to allow the paper pressing part to guide sheet-type media to be stacked on the paper supporting plate when the paper pressing plate is in the second position.

14. The cash recycling and processing apparatus according to claim 12, wherein the paper pressing part is rotatably connected to the connecting part, the paper pressing mechanism further comprises a paper pressing elastic member, a first end of the paper pressing elastic member is connected to the paper pressing part, a second end of the paper pressing elastic member is connected to the connecting part, and the paper pressing elastic member is configured to allow the paper pressing part to have a tendency to rotate towards the paper kicking roller.

15. The cash recycling and processing apparatus according to claim 10, wherein the paper pressing plate further comprises a paper pressing positioning part, the frame is further provided with a paper pressing limiting part, and when the paper pressing plate moves towards the paper kicking roller, the paper pressing limiting part is capable of abutting against the paper pressing positioning part, to prevent the paper pressing plate from continuing to move towards the paper kicking roller.

16. The cash recycling and processing apparatus according to claim 10, wherein the paper pressing mechanism further comprises a locking assembly configured to lock the paper pressing plate in the second position; the locking assembly comprises a locking member and a second elastic member, and the locking member is movably connected to the frame and has a locking position and an avoidance position;

when the locking member is in the locking position, the locking member cooperates with the paper pressing plate in the second position, to lock the position of the paper pressing plate; and when the locking member is in the avoidance position, the locking member is separated from the paper pressing plate, and the paper pressing plate in the second position is capable of being driven by the driving assembly to move towards the first position; and the second elastic member is connected between the frame and the locking member, and is configured to allow the locking member to have a tendency to move toward the locking position.

* * * * *